(12) United States Patent
Miyamae et al.

(10) Patent No.: US 12,138,842 B2
(45) Date of Patent: Nov. 12, 2024

(54) PTFE POROUS MEMBRANE WITH A HIGH STRENGTH AND SMALL PORE SIZE

(71) Applicant: Chemours-Mitsui Fluoroproducts Co. Ltd., Tokyo (JP)

(72) Inventors: Kohei Miyamae, Shizuoka (JP);
Shunichi Shimatani, Shizuoka (JP);
Kazuo Konabe, Shizuoka (JP); Ken Miura, Shizuoka (JP)

(73) Assignee: Chemours-Mitsui Fluoroproducts Co., Ltd., Tokyo (JP)

( * ) Notice: Subject to any disclaimer, the term of this patent is extended or adjusted under 35 U.S.C. 154(b) by 264 days.

(21) Appl. No.: 17/764,175

(22) PCT Filed: Sep. 24, 2020

(86) PCT No.: PCT/JP2020/035919
§ 371 (c)(1),
(2) Date: Mar. 26, 2022

(87) PCT Pub. No.: WO2021/060328
PCT Pub. Date: Apr. 1, 2021

(65) Prior Publication Data
US 2022/0355525 A1    Nov. 10, 2022

(30) Foreign Application Priority Data

Sep. 27, 2019 (JP) ................. 2019-176724

(51) Int. Cl.
*B01D 67/00* (2006.01)
*B01D 69/02* (2006.01)
(Continued)

(52) U.S. Cl.
CPC ........ *B29C 48/022* (2019.02); *B01D 67/0027* (2013.01); *B01D 67/0083* (2013.01);
(Continued)

(58) Field of Classification Search
CPC .. B01D 67/00–67/0097; B01D 69/00–69/148; B32B 27/322; C08J 5/2225
See application file for complete search history.

(56) References Cited

U.S. PATENT DOCUMENTS 7,306,729 B2 * 12/2007 Bacino ............... B01D 67/0027
210/500.36
2007/0012624 A1   1/2007 Bacino et al.
(Continued)

FOREIGN PATENT DOCUMENTS

CN    102939328 A    2/2013
CN    105829415 A    8/2016
(Continued)

OTHER PUBLICATIONS

"ASTM F316-03: Standard Test Methods for Pore Size Characteristics of Membrane Filters by Bubble Point and Mean Flow Pore Test", ASTM International, (2019); pp. 1-7.*
(Continued)

*Primary Examiner* — Prashant J Khatri

(57) ABSTRACT

The problem of the present invention is to provide a novel polytetrafluoroethylene porous film having a small pore diameter, small film thickness, high porosity, and high strength, and a production method thereof.

The present invention provides a polytetrafluoroethylene porous film, wherein a bubble point in isopropyl alcohol (IPA) according to JIS K3832 is not less than 400 kPa, and a tensile strength based on JIS K6251 is not less than 50 MPa.

7 Claims, 5 Drawing Sheets

(51) Int. Cl.
  *B01D 71/36* (2006.01)
  *B29C 48/00* (2019.01)
  *B29C 48/08* (2019.01)
  *B29C 55/14* (2006.01)
  *B29K 27/18* (2006.01)
  *B29K 105/04* (2006.01)

(52) U.S. Cl.
  CPC ............ *B01D 69/02* (2013.01); *B01D 71/36* (2013.01); *B29C 48/08* (2019.02); *B29C 55/14* (2013.01); *B01D 2325/02831* (2022.08); *B01D 2325/28* (2013.01); *B29C 2027/18* (2013.01); *B29K 2105/04* (2013.01)

(56) References Cited

U.S. PATENT DOCUMENTS

| | | |
|---|---|---|
| 2009/0281231 A1 | 11/2009 | Kasai et al. |
| 2011/0143114 A1* | 6/2011 | Horie .................. B32B 27/322 |
| | | 156/229 |
| 2011/0188247 A1 | 8/2011 | Huang et al. |
| 2012/0242733 A1 | 9/2012 | Ishinaga et al. |
| 2013/0084447 A1 | 4/2013 | Shimatani |
| 2013/0092623 A1 | 4/2013 | Tsujiwaki et al. |
| 2014/0339155 A1 | 11/2014 | Hayashi et al. |
| 2016/0075915 A1* | 3/2016 | Dutta .................. B01D 67/0088 |
| | | 428/316.6 |
| 2017/0001155 A1 | 1/2017 | Chaen et al. |
| 2017/0002156 A1 | 1/2017 | Chaen et al. |
| 2017/0231757 A1 | 8/2017 | Gassler |
| 2017/0325011 A1 | 11/2017 | Kuki et al. |
| 2023/0211296 A1 | 7/2023 | Miyamae et al. |

FOREIGN PATENT DOCUMENTS

| | | |
|---|---|---|
| CN | 109224885 A | 1/2019 |
| EP | 3075768 A1 | 10/2016 |
| EP | 1907105 B1 | 5/2017 |
| JP | 2007016058 A | 1/2007 |
| JP | 2011052175 A | 3/2011 |
| JP | 4850814 B2 | 1/2012 |
| JP | 2014133903 A | 7/2014 |
| JP | 2014207590 A | 10/2014 |
| JP | 6178034 B2 | 8/2017 |
| WO | 2007119829 A1 | 8/2009 |
| WO | 2010084912 A1 | 7/2010 |
| WO | 2013084858 A1 | 4/2015 |
| WO | 2016028591 A1 | 2/2016 |
| WO | 2021226227 A1 | 11/2021 |

OTHER PUBLICATIONS

Matweb, "Chemours Teflon PTFE 601A Resin for Lubricated Paste Extrusion", available at https://www.matweb.com/search/datasheet_print.aspx?matguid=6e185fed184440feaa89bec4d6896041, 3 pages, 2023.

* cited by examiner a) CASE OF CONTINUOUS STRETCHING b) CASE OF NON-CONTINUOUS STRETCHING

PTFE POROUS MEMBRANE WITH A HIGH STRENGTH AND SMALL PORE SIZE

TECHNICAL FIELD

The present invention relates to a polytetrafluoroethylene porous film which has a small pore diameter, small film thickness, high porosity, and high strength, and a production method thereof.

BACKGROUND ART

Polytetrafluoroethylene (PTFE) is used in a variety of fields due to its excellent heat resistance, chemical resistance, water repellency, weather resistance, and low dielectric constant. Because PTFE can easily be made porous by stretching, many PTFE porous films having various characteristics and production methods thereof have been invented in the past.

PTFE porous films have high air permeability and high water repellency and are therefore used in applications such as waterproof and air-permeable ware, vent filters for internal pressure regulation of automobile parts, and waterproof and sound-transmitting films for communication equipment.

Waterproof performance is expressed by a numerical value in a water pressure resistance test. For example, a water pressure resistance of 1 MPa is required of a film used in a mobile phone or the like with 100 m water resistance, but a film having a water pressure resistance of 1 MPa must have a pore diameter of not greater than a few tens of nanometers.

In addition, a waterproof and sound-transmitting film must not exhibit damping or degeneration with respect to a signal such as a voice speaking through the film, and in order to prevent the damping of signals or the addition of incidental noise due to the inherent vibration of the porous film itself, it is necessary for the pore diameter (maximum pore diameter) to be small, for the film thickness to be small, and for the porosity to be high—that is, for the surface density (weight of film per unit area) to be small. The surface density is determined from the porosity and the film thickness; for example, when the film thickness is 30 μm and the porosity is 70%, the surface density is approximately 20 $g/m^2$. In water proof and sound-transmitting applications, the surface density must be not greater than 10 $g/m^2$ and preferably a few $g/m^2$, and it must have high strength.

As dust-proofing applications, the substance may be used in filters for air purifiers or vacuum cleaners, bag filters for dust collection for a garbage incinerator or the like, air filters for clean rooms for semiconductor production, or the like.

In addition, PTFE is being used instead of conventional ultrafilters as final filters for ultrapure water production due to its purity—that is, the fact that there is practically no eluate.

Further, due to its excellent chemical resistance, it is also used in filter applications such as corrosive liquids, organic solvents, or etching solutions for circuit boards in semiconductor production applications, and applications such as the recovery of valuables in etching solutions.

In semiconductor production applications, the degree of integration of circuits has increased in recent years, and when fine particles on the nano-order are present in an etching solution, the fine particles remain on the wiring of the integrated circuits, which causes a reduction in production yield. Therefore, there is a demand for a PTFE porous film having a pore diameter on the nano-order so that fine particles on the nano-order in an etching solution can be removed, but it has been difficult to obtain a PTFE porous film which has a small film thickness, strength capable of withstanding filtration pressure or filtration operations, and a pore diameter on the nano-order without reducing the amount of transmission.

Typically, PTFE porous films are often produced by the following steps.

1. PTFE and a hydrocarbon solvent are mixed.
2. The cylinder cross-sectional area/outlet cross-sectional area ratio (RR) is made large, and shear (shearing force) is applied to the PTFE by extrusion molding to obtain a sheet-like or bead-like extruded product while fibrillizing the substance.
3. The obtained extruded product is rolled appropriately with a roll or the like to form a sheet shape, and the hydrocarbon solvent is then dried.
4. The obtained sheet-like product is stretched in the vertical and horizontal directions at a high temperature, and is then calcined at a temperature not lower than the melting point of PTFE (347° C. or higher) to obtain a PTFE porous film.

However, it is difficult to obtain a PTFE porous film having a small pore diameter with such a typical method. Therefore, in Patent Document 1, a PTFE dispersion is cast on an aluminum foil and dried to produce a non-porous fluororesin film primarily consisting of PTFE, and after the fluororesin film is laminated with a commercially available PTFE porous film having a small pore diameter, the aluminum foil is dissolved and removed with acid or the like. This is further stretched with a low magnification ratio and used in a semiconductor application as a filter with an integrally formed PTFE porous film having a small pore diameter.

In addition, in Patent Document 2, a polyimide film is immersed in a PTFE dispersion to form a PTFE coated film, and after drying/calcination steps are repeated to obtain a PTFE film, the PTFE film is peeled from the polyimide film. The peeled PTFE film is successively stretched in the TD direction (horizontal direction) and the MD direction (vertical direction) and used in a waterproof and sound-transmitting film application as a PTFE film having no signal damping or degeneration, a thin profile, and a small surface density.

In Patent Document 3, in the production process for a PTFE porous film, a semi-calcined film having a temperature gradient formed in the thickness direction by heating one side of the film prior to stretching is successively stretched and thermally fixed in the longitudinal direction and the width direction so that average pore diameter continuously decreases, thereby producing a stretched film having an average particle diameter of from 0.05 μm to 10 μm on the heating surface, having an asymmetric structure, and having a high filtration efficiency for use in the precise filtration of gases, liquids, and the like.

However, the dissolution of the aluminum foil with acid in the removal step in Patent Document 1 or the peeling of the PTFE film from the polyimide film in Patent Document 2 is not easy, and the tearing or the like of the PTFE also occurs. In addition, Patent Document 3 also requires complex steps. Although these conventionally known techniques are effective in certain limited applications, there are problems in that the surface density of the film increases or the film strength is insufficient in other applications, and it has been difficult to obtain a PTFE porous film satisfying all of the characteristics of a small pore diameter, small film thickness, high porosity, and high strength.

PRIOR ART DOCUMENTS

Patent Documents

Patent Document 1: WO 2013/084858
Patent Document 2: Japanese Patent No. 6178034
Patent Document 3: Japanese Patent No. 4850814
Patent Document 4: WO 2007/119829

SUMMARY OF THE INVENTION

Problem to be Solved by the Invention

The problem of the present invention is to provide a novel polytetrafluoroethylene porous film having a small pore diameter, small film thickness, high porosity, and high strength, and a production method thereof.

Means for Solving the Problem

The present invention provides a polytetrafluoroethylene porous film, wherein a bubble point in isopropyl alcohol (IPA) according to JIS K3832 is not less than 400 kPa, and a tensile strength based on JIS K6251 is not less than 50 MPa.

In addition, the present invention provides a polytetrafluoroethylene porous film, wherein a crystal fusion heat of the polytetrafluoroethylene porous film at 360 to 385° C. when heated to 400° C. at a rate of 10° C./min using a differential scanning calorimeter is not less than 5.0 J/g.

Note that the crystal fusion heat in this application is measured by pulling a baseline within a certain temperature range using a differential scanning calorimeter. For example, in this item, the crystal fusion heat (J/g) at 300 to 360° C. or at 360° C. to 385° C. is measured.

A preferable mode of the present invention is a polytetrafluoroethylene porous film in which, using a differential scanning calorimeter,
- a first heating run (1st. RUN) is performed up to 400° C. at a rate of 10° C./min;
- the film is cooled to 200° C. at a rate of 10° C./min; and
- a second heating run (2nd. RUN) is performed up to 400° C. at a rate of 10° C. to obtain a DSC curve; wherein a crystal fusion heat (J/g) (H4) of the polytetrafluoroethylene porous film at 300 to 360° C. in the second heating run (2nd. RUN) determined using the DSC curve is not greater than 20 J/g.

A preferable mode of the present invention is a polytetrafluoroethylene porous film in which a degree of calcination (S) of the porous film expressed by the following Formula 1 is not less than 0.9.

$$\text{Degree of calcination } (S) = (H1-H3)/(H1-H4) \quad [\text{FORMULA 1}]$$

H1: Crystal fusion heat (J/g) of polytetrafluoroethylene, with no history of heating to 300° C. or higher, at 300 to 360° C. when heated to 400° C. at a rate of 10° C./min using a differential scanning calorimeter
H3: Crystal fusion heat (J/g) of the polytetrafluoroethylene porous film at 300 to 360° C. in the first heating run (1st. RUN)
H4: As described above A preferable mode of the present invention is a polytetrafluoroethylene porous film in which a porosity is not less than 70%.

A preferable mode of the present invention is a polytetrafluoroethylene porous film in which a film thickness of the porous film is not greater than 30 μm.

A preferable mode of the present invention is a polytetrafluoroethylene porous film obtained from polytetrafluoroethylene having a standard specific gravity of not less greater than 2.15 and satisfying the following Formula 2.

$$H1-H2 \geq 12 \quad [\text{FORMULA 2}]$$

H1: As described above
H2: Crystal fusion heat (J/g) of a molded product at 300 to 360° C. when heated to 400° C. at a rate of 10° C./min using a differential scanning calorimeter, the molded product being obtained by adding 28.7 ml of naphtha having a boiling point of from 150 to 180° C. to 100 g of polytetrafluoroethylene having no history of heating to 300° C. or higher and mixing for 3 minutes, leaving the mixture to stand for 2 hours at 25° C., and then extrusion-molding the mixture at a cylinder cross-sectional area/outlet cross-sectional area ratio (RR) of 100, a molding temperature of 25±1° C., and a ram extrusion rate of 0.5 m/min using an extruder to obtain a bead-like extruded product, drying the bead-like extruded product for 1.5 hours at 25±1° C. and drying for 2 more hours at 150° C. to form a dried product; and stretching the dried product 24 times in the extrusion direction at a molding temperature of 300° C. and a rate of 100%/sec to obtain a molded product The present invention also provides a production method for a polytetrafluoroethylene porous film obtained by: adding and mixing a hydrocarbon solvent having a boiling point of from 150 to 290° C. into the specific PTFE described above; extruding at an RR of from 35 to 120 using an extruder; rolling to a thickness of not greater than 800 μm; heating to 150° C. or higher to remove the hydrocarbon solvent by evaporation; successively performing biaxial stretching in an extrusion direction (vertical direction) and a direction orthogonal to the extrusion direction (horizontal direction) to obtain a porous film; and calcining the porous film at a temperature equal to or higher than a melting point of polytetrafluoroethylene.

A preferable mode of the present invention is a production method for a polytetrafluoroethylene porous film, comprising setting a shear rate expressed b the following Formula 3 in the extrusion direction to not less than 20%/sec, and successively performing biaxial stretching at least five times in the extrusion direction and at least five times a direction orthogonal to the extrusion direction.

$$\text{Shear rate } ((\%/\text{sec}) = (V\text{ex}-V\text{in})/L \times 100 \quad [\text{FORMULA 3}]$$

a) In the case of continuous stretching
  Vex: Rate at an outlet of a vertical stretching device (mm/sec)
  Vin: Rate at an inlet of the vertical stretching device (mm/sec)
  L: Stretching distance (distance between two sets of rolls) (mm)
b) In the case of non-continuous stretching
  (Vex-Vin): Stretching rate of a biaxial stretching device (mm/sec)
  L: Stretching distance (value obtained by subtracting a size of the sheet-like rolled product prior to stretching from a size of the sheet-like product after stretching) (mm)

Effect of the Invention

The PTFE porous film of the present invention has a small pore diameter, small film thickness, high porosity, and high strength (tensile strength). The present invention can be used in applications such as waterproof and sound-transmitting applications for communication equipment, vent filters for automobiles requiring high water resistance, dust-proofing applications such as bag filters or air filters for dust collection, filter applications such as corrosive liquids, organic solvents, or etching solutions for circuit boards in semiconductor production applications, and applications such as the recovery of valuables in etching solutions.

EMBODIMENTS OF THE INVENTION

Figure 1:
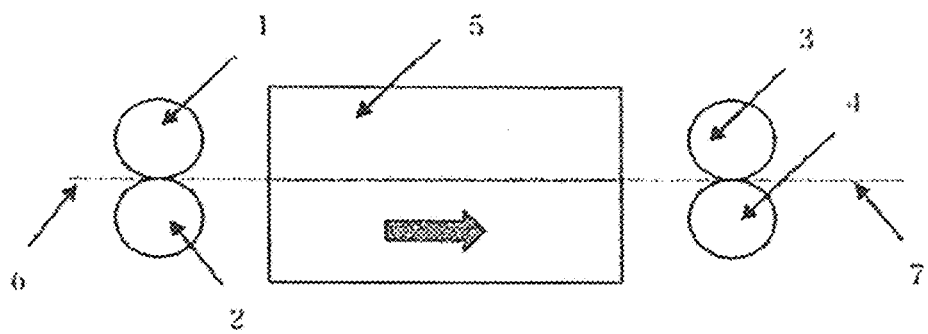
FIG. 1 is a schematic diagram of a continuous stretching device and a non-continuous stretching device.
Figure 1:
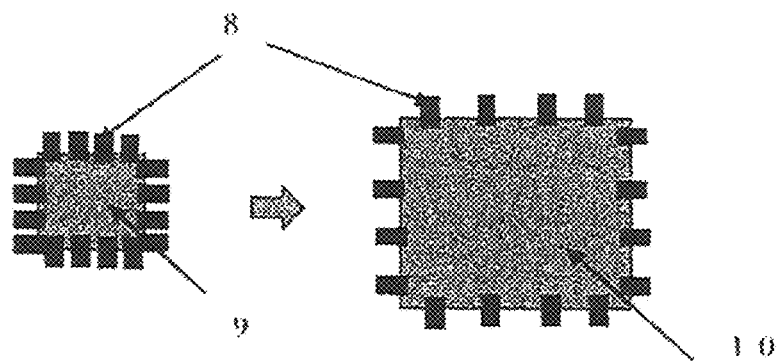

The bubble point of the present invention in isopropyl alcohol (IPA) according to JIS K3832 is not less than 400 kPa, preferably not less than 450 kPa, and more preferably not less than 500 kPa. The fact that the bubble point is not less than 400 kPa indicates that the pore diameter of the PTFE porous film is small enough to remove fine particles on the nano-order. The maximum particle diameter of a PTFE porous film is typically calculated from the following formula using the bubble point.

$$\text{Maximum pore diameter of PTFE porous film (diameter: nm)} = 4 \times \gamma \times \cos \Theta / P \times 10^9 \quad [\text{FORMULA 4}]$$

γ: Surface tension of IPA (Pa·m)
Θ: Contact angle between IPA and porous film (Θ=0)
P: Bubble point pressure (Pa)

When the bubble point is 400 kPa, the maximum pore diameter of the PTFE porous film of the present invention calculated from Formula 4 is approximately 200 nm, but because there are many pore diameters of 200 nm or less in the PTFE porous film, particles on the order of ten nanometers can be captured. When the bubble point is less than 400 kPa, it is difficult to remove fine particles on the nano-order, and the waterproofing properties are also diminished, which is not preferable.

The PTFE porous film of the present invention is a porous film with no water leakage, even when a water pressure of a height of nearly 100 m is applied in vent filter or waterproof and sound-transmitting applications.

The tensile strength of the present invention based on JIS K6251 is a value determined by dividing the tensile stress by the cross-sectional area (MPa), so it is unaffected by the film thickness, and PTFE porous films of different film thicknesses can also be compared by the values of the tensile strength itself. The tensile strength of the PTFE porous film of the present invention is not less than 50 MPa, preferably not less than 60 MPa, and more preferably not less than 65 MPa. When the tensile strength is 50 MPa or greater, the PTFE porous film has sufficient strength and is resistant to the thinning of the PTFE porous film and liquid or gas filter pressure or filter operations, which is preferable in that the amount of transmission can increase. When the tensile strength is lower than 50 MPa, it becomes difficult to make the PTFE porous film thin, and in a step of bonding to a base material during filter film production or a step of processing the film into a pleated shape together with a base material, the PTFE porous film with a thin profile tears due to insufficient strength, which is not preferable.

In addition, it is described in Patent Document 2 describe above that in waterproof and sound-transmitting film applications, the tensile strength is not less than 30 MPa, but the PTFE porous film of the present invention has a tensile strength of not less than 50 MPa, and this makes it possible to form a thinner film, which enables the further enhancement of sound transmitting characteristics. Further, the film can also be welded to the waterproof and sound-transmitting members described in this patent.

The tensile strength of the PTFE porous film is correlated to the calcination conditions of the PTFE. When the degree of calcination (S) calculated from Formula 1 is 0.9 or greater, the resulting PTFE porous film has a high bubble point and a large tensile strength. On the other hand, when the degree of calcination (S) is too high, the PTFE fiber structure associated with stretching is destroyed, and the pore diameter of the PTFE porous film becomes large, so the degree of calcination (S) is preferably less than 0.98.

The degree of calcination (S) is commonly used by those skilled in the art, but the specific degree of calcination (S) of the present invention enables a PTFE porous film having both a large tensile strength and small pore diameter.

The crystal fusion heat of the PTFE porous film of the present invention at 360 to 385° C. when heated to 400° C. at a rate of 10° C./min using a differential scanning calorimeter is preferably not less than 5.0 J/g. The crystal fusion heat is more preferably not less than 5.4 J/g. When the crystal fusion heat of the PTFE porous film at 360 to 385° C. when heated to 400° C. at a rate of 10° C./min is less than 5.0 J/g, a tensile strength of 50 MPa or greater cannot be achieved, resulting in a film with poor tensile strength.

Figure 2:
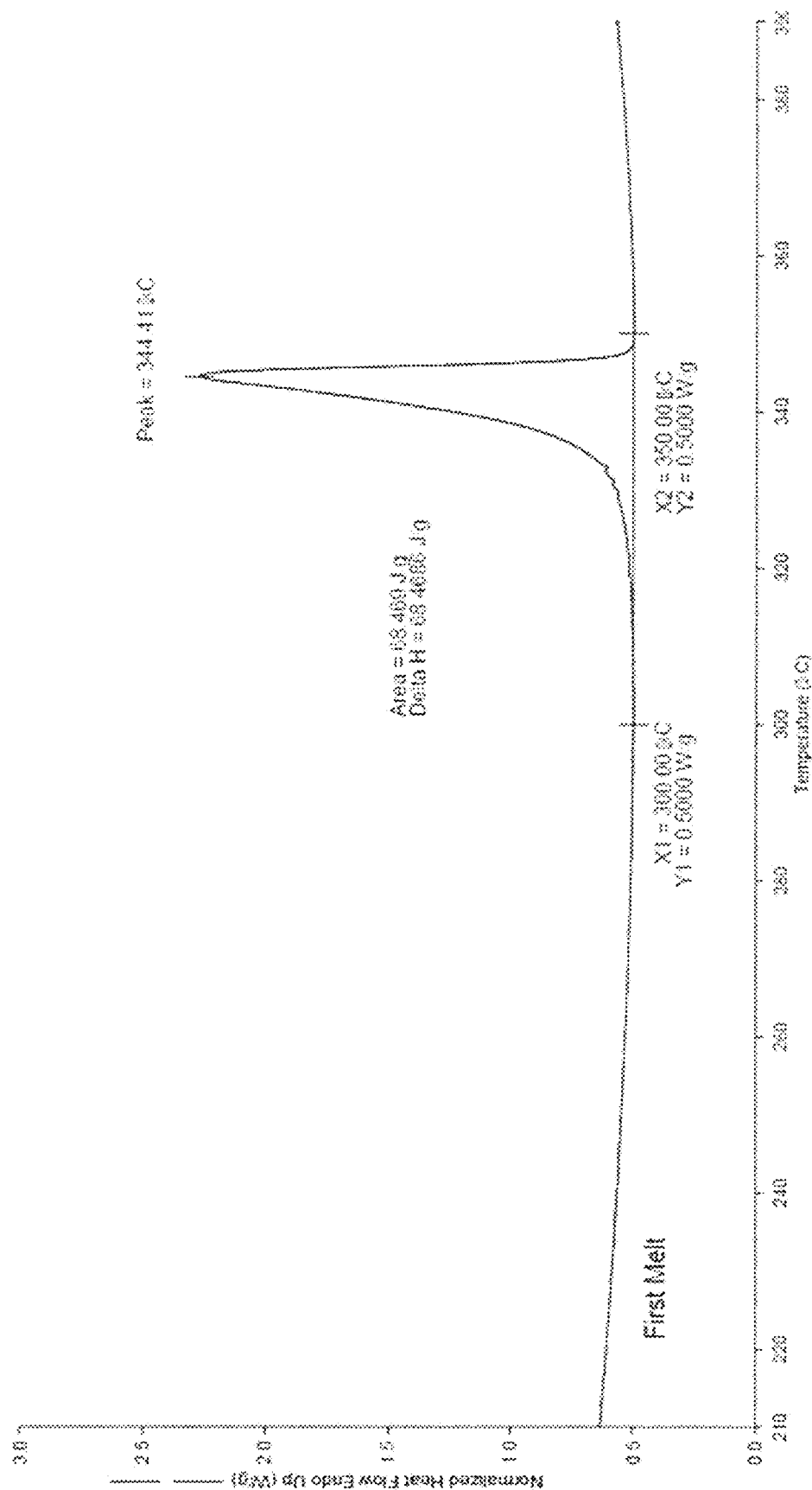
FIG. 2 is a DSC curve of the PTFE of Example 1 determined with a differential scanning calorimeter.

The endothermic peaks in a PTFE porous film within the temperature range of 300° C. or higher according to a differential scanning calorimeter are typically an endothermic peak at 300 to 360° C. derived from uncalcined crystals formed at the time of PTFE polymerization, and an endothermic peak at 327° C. derived from crystals rearranged by cooling after the uncalcined PTFE crystals are melted at a temperature higher than the melting point, but the PTFE porous film of the present invention exhibits an endothermic peak at 360 to 385° C. in addition to these two peaks. The endothermic peak at 360 to 385° C. is not expressed in the PTFE itself used in the present invention (see FIG. 2), a bead-like or sheet-like extruded product of the PTFE, or a sheet-like rolled product obtained by rolling the extruded product, and first appears in a stretched film obtained by stretching the sheet-like rolled product (PTFE porous film) (see FIG. 3). Further, since this endothermic peak does not disappear even when the PTFE porous film is calcined at 385° C., it is considered a new PTFE crystal generated by the fibrillization of PTFE. This new PTFE crystal is a very large, rigid PTFE crystal which melts at around 375° C., so the fact that the crystal fusion heat of the PTFE porous film at 360 to 385° C. is 5.0 J/g or higher is an indicator of a PTFE porous film having a high tensile strength.

In the PTFE porous film of the present invention, using a differential scanning calorimeter,
    a first heating run (1st. RUN) is performed up to 400° C. at a rate of 10° C./min;
    the film is cooled to 200° C. at a rate of 10° C./min; and
    a second heating run (2nd. RUN) is performed up to 400° C. at a rate of 10° C. to obtain a DSC curve; wherein
    a crystal fusion heat (J/g) (H4) of the polytetrafluoroethylene porous film at 300 to 360° C. in the second heating run (2nd. RUN) determined using the DSC curve is not greater than 20 J/g and preferably not greater than 18 J/g.

It can be seen that the smaller H4 is, the smaller the standard specific gravity (SSG) of the PTFE used in the production of the PTFE porous film of the present invention becomes, resulting in a high-molecular-weight PTFE. When H4 exceeds 20 J/g, the SSG is large—that is the molecular weight of the PTFE is small—which is not preferable in that it becomes difficult to obtain the target PTFE porous film of the present invention having a small pore diameter and high strength.

The porosity of the PTFE porous film of the present invention refers to the ratio of the total volume of holes to the volume of the PTFE porous film, and can be measured by Archimedes' method, a weight porosity method, or a mercury porosity method. The porosity of the PTFE porous film of the present invention can be determined by measuring the density of the PTFE porous film of the present invention in accordance with ASTM D792, and is not less than 70%, preferably not less than 75%, and more preferably not less than 80% and less than 100%. The porosity is preferably high in order to enhance the liquid filter performance or air permeability of the PTFE porous film, which makes it possible to achieve excellent characteristics as a porous film for liquid filter applications such as corrosive liquids, organic solvents, or etching solutions for circuit boards in semiconductor production applications, gas filter applications, gas filter applications for vent filters, or waterproof and sound-transmitting applications. In addition, a higher porosity leads to a smaller surface density (weight of film per unit area) determined in waterproof and sound-transmitting applications, which is preferable.

The film thickness of the PTFE porous film of the present invention is not greater than 30 μm, preferably not greater than 20 μm, and more preferably not greater than 10 μm. The PTFE porous film is more preferably a thin film, but a thinner film typically leads to a reduction in the strength of the PTFE porous film, which may leads to problems in the production process. Since the PTFE porous film of the present invention has sufficient strength, a thin film of not greater than 30 μm can be achieved, and sufficient strength can be achieved even at a film thickness of not greater than 10 μm and a porosity of not less than 85%, which enables the production of a waterproof and sound-transmitting film having a surface density (weight of film per unit area).

The standard specific gravity (SSG) of the PTFE used in the production of the PTFE porous film of the present invention based on ASTM D4895 is preferably not greater than 2.15. The standard specific gravity is preferably not greater than 2.14. The SSG is correlated to the molecular weight of PTFE, and a smaller SSG indicates that the molecular weight of PTFE is higher. As the molecular weight of the PTFE increases, it becomes easier to fibrillize the primary particles of PTFE by shear (shearing force), which enables the production of a PTFE porous film having a small pore diameter. In addition, a higher molecular weight of PTFE also means a higher tensile strength.

Note that the PTFE used to form a porous film may be modified PTFE which is modified by comonomers that are copolymerizable with tetrafluoroethylene (TFE) within a range that does not diminish the characteristics of the PTFE. An example thereof is a copolymer of the TFE described in Patent Document 4 and a trace amount of a monomer other than TFE. However, some modified PTFEs have a small SSG in spite of having a low molecular weight. This is because the SSG measurement determines the amount of recrystallization after heating to the crystal transition temperature or higher and then cooling based on specific gravity. That is, when recrystallizing, recrystallization is obstructed due to the presence of trace amounts of monomers (comonomers) other than TFE in comparison to a polymer of TFE alone, which causes a decrease in crystallinity and also reduces the value of specific gravity. Accordingly, even if the SSG is not greater than 2.15, the molecular weight may be low. With such a resin, primary particles are difficult to fibrillize, and a porous film having a small pore diameter cannot be produced.

Therefore, the PTFE used in the production of the PTFE porous film of the present invention is preferably a PTFE which has an SSG of not greater than 2.15, does not have a history of heating to 300° C. or higher, and satisfies Formula 2 described above. With a PTFE which has an SSG of not greater than 2.15 and does not have a history of heating to 300° C. or higher, the primary particles are fibrillized easily by the shear (shearing force) when stretched in the extrusion direction, and a some of the crystals of primary particles are destroyed. When the PTFE is easier to fibrillize, a PTFE porous film of a smaller pore diameter can be produced. On the other hand, the crystal fusion heat of PTFE primary particles which remain without being fibrillized can be measured using a differential scanning calorimeter, so the degree of fibrillization of the PTFE can be determined using the difference in crystal fusion heat before and after the fibrillization of the PTFE, and the advisability of producing a PTFE porous film having a small pore diameter can be assessed.

The value of H1-H2 expressed by Formula 2 described above is not less than 12.

The naphtha used for the measurement of H2 in Formula 2 is a hydrocarbon solvent consisting of at least one type of branched-chain saturated hydrocarbon with a carbon number of from 8 to 14 having a boiling point of from 150 to 180° C., examples of which include Isopar G (carbon number:9-12; boiling point: 160-176° C.) available from ExxonMobile and Supersol FP25 (carbon number: 11-13; boiling point: not lower than 150° C.) available from Idemitsu Kosan Co., Ltd., but Supersol FP25 available from Idemitsu Kosan Co., Ltd. is preferable from the perspective of the ease of removing the solvent from the bead-like extruded product in H2. The fibrillization of PTFE is affected by the type of the hydrocarbon solvent and the added amount thereof, but the added amount has a greater effect, so Supersol FP25 available from Idemitsu Kosan Co., Ltd. is preferably added in an amount of 28.7 mL per 100 g of the PTFE.

In addition, H2 is measured using a molded product obtained by fixing both ends of a bead-like extruded product with a length of 50 mm and stretching 24 times in the extrusion direction. The extrusion molding of the bead-like extrusion product can be performed using a PTFE porous film production device or an extrusion molding machine capable of molding an extruded product approximately 1 mm in diameter, and the stretching of the bead-like molded product can be performed using a stretching device or a tensile tester.

In the stretching method of the present invention, there is a correlation between Formula 2 described above and the bubble point of the PTFE porous film due to IPA. When PTFE having a standard specific gravity of not greater than 2.15 satisfies Formula 2, this results in a porous film having excellent tensile strength with a bubble point of not less than 400 kPa due to IPA. In addition, the crystal fusion heat of the porous film at 360 to 385° C. when heated to 400° C. at a rate of 10° C./min using a differential scanning calorimeter is not less than 5.0 J/g.

The PTFE used in the production of the PTFE porous film of the present invention can be obtained as a PTFE which has an SSG of not greater than 2.15 and satisfies Formula 2 by polymerizing tetrafluoroethylene (TFE) by emulsion polymerization in an aqueous medium in the presence of polymerization initiators (potassium permanganate and oxalic acid), a fluorine-containing surfactant and polymerization stabilizer (higher paraffin), succinic acid, and an ionic strength adjuster (zinc chloride) to obtain an aqueous dispersion containing PTFE primary particles, and then drying or granulating/drying the aqueous dispersion. As described above, the substance may be a modified PTFE which is modified by comonomers that are copolymerizable with tetrafluoroethylene (TFE) within a range that does not diminish the characteristics of PTFE.

The PTFE porous film of the present invention can be produced by adding and mixing a hydrocarbon solvent having a boiling point of from 150 to 290° C. into the PTFE described above, extruding to an RR of 35 or greater using an extruder, rolling, heating to 150° C. or higher to remove the hydrocarbon solvent by evaporation, successively performing biaxial stretching in the extrusion direction (vertical direction) and a direction orthogonal to the extrusion direction (horizontal direction) to obtain a porous film, and then calcining the porous film at a temperature equal to or greater than the melting point of the PTFE.

Examples of the hydrocarbon solvent used in the production of the PTFE porous film of the present invention include, in addition to the naphtha used in the measurement of Formula 2 described above, straight-chain saturated hydrocarbon solvents and/or branched-chain saturated hydrocarbon solvents consisting of at least one type with a carbon number of from 8 to 16 having a boiling point of from 150 to 290° C. Examples of straight-chain saturated hydrocarbon solvents include Norpar 13

(carbon number: 12-14: boiling point: 222-243° C.) and Norpar 15 (carbon number: 9-16; boiling point: 255-279° C.), and examples of branched-chain saturated hydrocarbon solvents include Isopar G (carbon number: 9-12; boiling point: 160-176° C.), Isopar H (carbon number: 10-13; boiling point: 178-188° C.), and Isopar M (carbon number: 11-16; boiling point: 223-254° C.) available from ExxonMobile and Supersol FP25 available from Idemitsu Kosan Co., Ltd. (carbon number: 11-13; boiling point: not lower than 150° C.). However, it is preferable to use Isopar M in that it can prevent the evaporation of the solvent during rolling, it can be removed easily by heating, and it is odorless.

The production method will be described more specifically hereinafter.

1. In order to facilitate extrusion molding, the hydrocarbon solvent described above (preferably Isopar M available from ExxonMobile) is added to PTFE in an amount of not greater than 20 wt. %, preferably not greater than 18 wt. %, and more preferably not greater than 16 wt. %, mixed for 3 to 5 minutes, and left to stand for at least 12 hours at 20° C. or higher (after obtaining a cylindrical preliminary molded product at 25° C.±1° C. as necessary);

2. the sample is extrusion-molded using an extruder at an RR of from 35 to 120, preferably from 50 to 120, and more preferably from 50 to 80, a molding temperature of from 40 to 60° C. and preferably from 40 to 50° C., and a ram extrusion rate of from 10 to 60 mm/min and preferably from 20 to 30 mm/min to obtain a sheet-like or bead-like extrusion-molded product. When the ram extrusion rate is less than 10 mm/min, the productivity decreases, which is not preferable, and when the extrusion rate is greater than 60 mm/min, the extrusion pressure may rise, or it may become difficult to obtain a uniform extrusion-molded product, which is not preferable.

When the RR is less than 55, a sufficient shear (shearing force) is not applied to the primary particles of PTFE and the PTFE primary particles not fibrillized, so the strength of the extrusion-molded product decreases, which is not preferable.

In addition, as the RR is increased, the molding pressure at the time of extrusion molding increases, and a large molding machine becomes necessary when the RR exceeds 120, which is not preferable.

Further, when the molding temperature is less than 40° C., the compatibility of the hydrocarbon solvent and the PTFE is poor, and the fluidity decreases, which is not preferable. When the molding temperature exceeds 60° C., the hydrocarbon solvent evaporates, which is not preferable.

3. The extrusion-molded product described above is rolled to 800 µm or less, preferably 400 µm or less, and more preferably 200 µm or less in the extrusion direction (vertical direction) with two sets of rolls (nip rolls) heated to 40° C. or higher to obtain a sheet-like rolled product. The sheet-like rolled product is dried for at least 5 minutes and preferably at least 15 minutes at 200° C. to evaporate the hydrocarbon solvent and obtain a dried product. Rolling to 200 µm or less facilitates the evaporation of the hydrocarbon solvent and facilitates the molding of a PTFE porous film having a thickness of not greater than 30 µm.

4. The sheet-like rolled product described above is successively stretched using a stretching device in the extrusion direction (vertical direction) and a direction orthogonal to the extrusion direction (horizontal direction) at a molding temperature of from 150 to 320° C. and preferably 300° C. and a shear rate of not less than 20%/sec, preferably not less than 30%/sec, and even more preferably 60%/sec as indicated in Formula 3 to obtain a stretched product.

The stretching ratios in the vertical direction and the horizontal direction are preferably at least 7 times and more preferably at least 10 times. It is unnecessary to set the stretching ratios in the vertical direction and the horizontal direction to the same ratio. Although also dependent on the thickness after rolling, the stretching ratio in the vertical direction is preferably at least 7 times in that the thickness of the PTFE porous film can be easily set to 30 µm or less.

5. The stretched product described above is calcined (thermally fixed) for 10 to 120 seconds at a temperature equal to or greater than the melting point of the PTFE, preferably from 350 to 400° C., and more preferably from 370 to 385° C. to obtain a PTFE porous film.

The shear rate expressed by Formula 3 in the present invention is related to the speed at the time of deformation, and is not less than 20%/sec, preferably not less than 30%/sec, and more preferably 60%/sec. A greater shear rate makes it possible to obtain a PTFE porous film with a higher bubble point—that is, a smaller pore diameter. It is unnecessary to make the shear rates the same in the vertical direction and the horizontal direction, and the shear rate in each direction can be determined in accordance with the purpose. The shear rate is particularly effective for stretching in the vertical direction, and even if the shear rate for stretching in the horizontal direction is smaller than the shear rate in the vertical direction, the target PTFE porous film having a small pore diameter according to the present invention can be obtained.

In the stretching step for obtaining a PTFE porous film, a continuous stretching method of continuously stretching the sheet-like rolled product in the same direction as the vertical direction and then continuously stretching the rolled product in the horizontal direction, or a non-continuous stretching method of stretching the rolled product non-continuously (in batches) using a biaxial stretching device is used. In the present invention, a PTFE porous film can be obtained by appropriately selecting the stretching method or the stretching device in accordance with the characteristics of the target PTFE porous film.

In the continuous stretching method, a vertical stretching device having a plurality of sets of rolls (nip rolls) capable of heating and nipping (compressing) vertically is first used to continuously stretch the sheet-like rolled product in the same direction (vertical direction) as the extrusion direction (vertical direction) of the sheet-like rolled product while varying the speed of each set of rolls. When continuously stretching in the extrusion direction (vertical direction) using a plurality of sets of rolls, it is preferable to establish a speed ratio in the rotational speeds of each of the sets of rolls. For example, in FIG. 1a, it is preferable to set the rotational speed of set of rolls on the outlet side to a higher value than the rotational speed of the set of rolls on the inlet side in that a greater degree of stretching is possible (stretching at a high ratio of 10 times or greater). The roll diameter is not particularly limited but is typically approximately 200 mm.

In addition, a method of continuously stretching in the extrusion direction (vertical direction) using a device equipped with a heating zone between each of the sets of rolls—for example, a device having the heating furnace illustrated in FIG. 1a—may also be suitably used.

When a vertical stretching device having two sets of rolls (nip rolls) capable of nipping (compressing) illustrated in FIG. 1a is used and Vex in Formula 3 is set to 500 mm/sec, Vin is set to 100 mm/sec, and L is set to 1000 mm (that is, the distance between two sets of rolls is 1000 mm the shear rate is 40%/sec ((500-100)/1000*100=40).

Next, both sides of the sheet-like rolled product that has been continuously stretched in the vertical direction is grasped with a chuck using a stretchable tenter (horizontal stretching device) capable of continuously stretching in a direction orthogonal to the extrusion direction (horizontal direction), and the chuck is moved while heating to continuously stretch the sheet-like rolled product in the horizontal direction and to obtain a PTFE porous film.

In the non-continuous stretching method, the sheet-like rolled product is cut to a prescribed shape and size, and after the four corners or the periphery of the cut sheet-like rolled product are fixed with a chuck, the chuck is successively stretched in the vertical direction and the horizontal direction using a biaxial stretching device (FIG. 1b). This batch method is repeated to continuously obtain a PTFE porous film.

In the non-continuous stretching method, (Vex-Vin) in Formula 3 is the stretching rate (rate of moving the chuck). Here, L (distance between stretching) is a value determined by subtracting the size of the sheet-like rolled product prior to stretching from the size of the sheet-like rolled product after stretching. For example, when the vertical stretching rate is 400 mm/sec and L is 400 mm (that is, L is 400 mm when the size of the PTFE sheet prior to stretching is 100 mm squared and the sheet is stretched to 500 mm squared), the shear rate is 100%/sec (400/(500-100)*100=100).

EXAMPLES

The present invention will be described in further detail hereinafter using examples, but the present invention is not limited to these examples alone.

(Standard Specific Gravity (SSG))
The standard specific gravity of the PTFE was determined in accordance with ASTM D4895.
(Bubble Point)
The bubble point in isopropyl alcohol (IPA) was measured in accordance with JIS K3832 using a Porolux1000 manufactured by the MicrotracBEL Corporation.
(Tensile Strength and Air Permeability)
Using a porous film sample prepared from a PTFE porous film obtained under the conditions shown in Table 1 (vertical stretching direction: 50 mm; horizontal stretching direction: 10 mm), the tensile strength was measured at 25° C., a chuck interval of 22 mm, and a tensile speed of 200 mm/min using a Tensilon RTC1310A manufactured by Orientec Co., Ltd., and the air permeability was measured using a fragile shape tester.
(Porosity)
The true density of PTFE (2.2 g/cm3) and the density of the PTFE porous film of the present invention measured in accordance with ASTM D792 were used to determine the porosity of the PTFE porous film from the following formula.

Porosity (%) =1−(density of PTFE porous film/true density of PTFE in PTFE porous film)×100

(Film Thickness)
The film thickness was measured using a dial thickness gauge manufactured by the Peacock Corporation.
(Crystal Fusion Heat)
1. The crystal fusion heat (J/g) of H1 described above at 300 to 360° C. was determined from a DSC curve obtained by heating 10 mg of PTFE having no history of heating to 300° C. or higher to 400° C. at a rate of 10° C./min using a differential scanning calorimeter (Diamond DSC manufactured by PerkinElmer Co., Ltd.).
2. The crystal fusion heat (J/g) of H2 described above at 300 to 360° C. was determined in the same manner as in (1) above with the exception that 10 mg of the following sample for measuring H2 was used.
(H2 Measurement Sample)
A molded product was used as the H2 measurement sample, the molded product being obtained by adding 28.7 ml of naphtha having a boiling point of from 150 to 180° C. (Supersol FP252 available from Idemitsu Kosan Co., Ltd.) to 100 g of PTFE having no history of heating to 300° C. or higher and mixing for 3 minutes, leaving the mixture to stand for 2 hours at 25° C., and then extrusion-molding the mixture at a cylinder cross-sectional area/outlet cross-sectional area ratio (RR) of 100, a molding temperature of 25±1° C., and a ram extrusion rate of 0.5 m/min using an extruder to obtain a bead-like extruded product, drying the bead-like extruded product for 1.5 hours at 25±1° C. and drying for 2 more hours at 150° C., cutting the bead-like dried product to a length of 51 mm and fixing both ends, and stretching the dried product 24 times in the extrusion direction at a molding temperature of 300° C. and a rate of 100%/sec to obtain a molded product.
3. The crystal fusion heat of the PTFE porous film was determined by using the differential scanning calorimeter described above, wherein 10 mg of a PTFE porous film obtained under the conditions shown in Table 1 was subjected to a first heating run (1st. RUN) up to 400° C. at a rate of 10° C./min, cooled to 200° C. at a rate of 10° C./min, subjected to a second heating run (2nd. RUN) up to 400° C. at a rate of 10° C./min to obtain a DSC curve, and using the DSC curve to determine the crystal fusion heat (J/g) at 300 to 360° C. at the time of the first heating run (1st. RUN) as H3 and to determine the crystal fusion heat (J/g) at 300 to 360° C. at the time of the second heating run (2nd. RUN) as H4.

(PTFE Porous Film Structure)

After the PTFE porous film was sputtered with a platinum palladium alloy, it was observed with an electron microscope (SU-8000 manufactured by Hitachi High Technologies Corporation.

(PTFE)

First, 60 g of paraffin wax, 2300 ml of deionized water, 12 g of an ammonium salt of fluoromonoether acid (formula $C_3F_7$—O—$CF(CF_3)COOH$)), 0.05 g of an ammonium salt of fluoropolyether acid ($C_3F_7$—O—$[CF(CF_3)CF_2]_n$—CF$(CF_3)COOH$), 0.75 g of succinic acid, 0.026 g of oxalic acid, and 0.01 g of zinc chloride were charged into a stainless steel (SUS316) autoclave with a capacity of 4 liters equipped with a stirring blade and a temperature adjustment jacket, and after the inside of the system was replaced three times with nitrogen gas while heating to 80° C., a vacuum was drawn. The internal pressure was then set to 2.75 MPa with tetrafluoroethylene (TFE), and the internal temperature was maintained at 63° C. while stirring at 111 rpm.

Next, 510 ml of an aqueous solution prepared by dissolving 40 mg of potassium permanganate ($KMnO_4$) in 2000 ml of water was infused with a pump. At the point when the infusion of potassium permanganate was complete, the internal temperature was raised to 85° C., and TFE was then supplied. Stirring was discontinued at the point when the TFE consumption reached 740 g. The gas inside the autoclave was released until the pressure reached normal pressure, and a vacuum was pulled. After the pressure was returned to normal pressure with nitrogen gas, the contents were retrieved and the reaction was ended.

The solid content of the resulting PTFE dispersion was 27%, and the average particle size of the primary particles was 0.23 μm. This PTFE dispersion was dried for 11 hours at 190° C. to obtain a PTFE fine powder. The standard specific gravity (SSG) and the crystal fusion heat (H1, H2, and H1–H2) of the obtained PTFE fine powder are shown in Table 1.

Examples 1 to 3

A cylindrical preliminary molded product was obtained by adding Isopar M available from ExxonMobile in the amount shown in Table 1 to the PTFE fine powder described above, mixing for 5 minutes using a Turbula shaker manufactured by Willy A. Bachofen AG, leaving the mixture to stand for 24 hours at 25° C., charging the mixture into a cylinder with a diameter of 80 mm of a preliminary molding machine, placing a cover on the upper part of the cylinder, and compression-molding at a rate of 50 mm/min. The preliminary molded product that was obtained was extrusion-molded using an extruder at an RR of 36, a molding temperature of 50° C., an extrusion rate of 20 mm/min, and using an extrusion die (1 mm thick×150 mm wide) to obtain a sheet-like extrusion-molded product. The obtained sheet-like extrusion-molded product was rolled in the extrusion direction (vertical direction) to the rolling thickness shown in Table 1 with two sets of rolls heated to 50° C. and dried for 15 minutes at 200° C., and the Isopar M was removed by evaporation to obtain a sheet-like rolled product, which was cut into a square shape (90 mm squared).

Using a biaxial stretching device (model EX10-S5 manufactured by Toyo Seiki Kogyo Co., Ltd., the periphery of the square (90 mm squared) rolled product was fixed with a chuck (size excluding the grip parts of the chuck of the biaxial stretching device: 72 mm squared) and successively stretched ten times in the vertical direction and the horizontal direction at a molding temperature of 300° C. and the stretching rate (rate of moving the chuck) and shear rate shown in Table 1 (size excluding the grip parts of the chuck of the biaxial stretching device: 720 mm squared) (batch method). Two plates heated to 370° C. were respectively held for 10 seconds at a distance of 5 mm above and below the obtained stretched product, and after the stretched product was calcined, the chuck at the periphery was removed to obtain a PTFE porous film.

Figure 3:
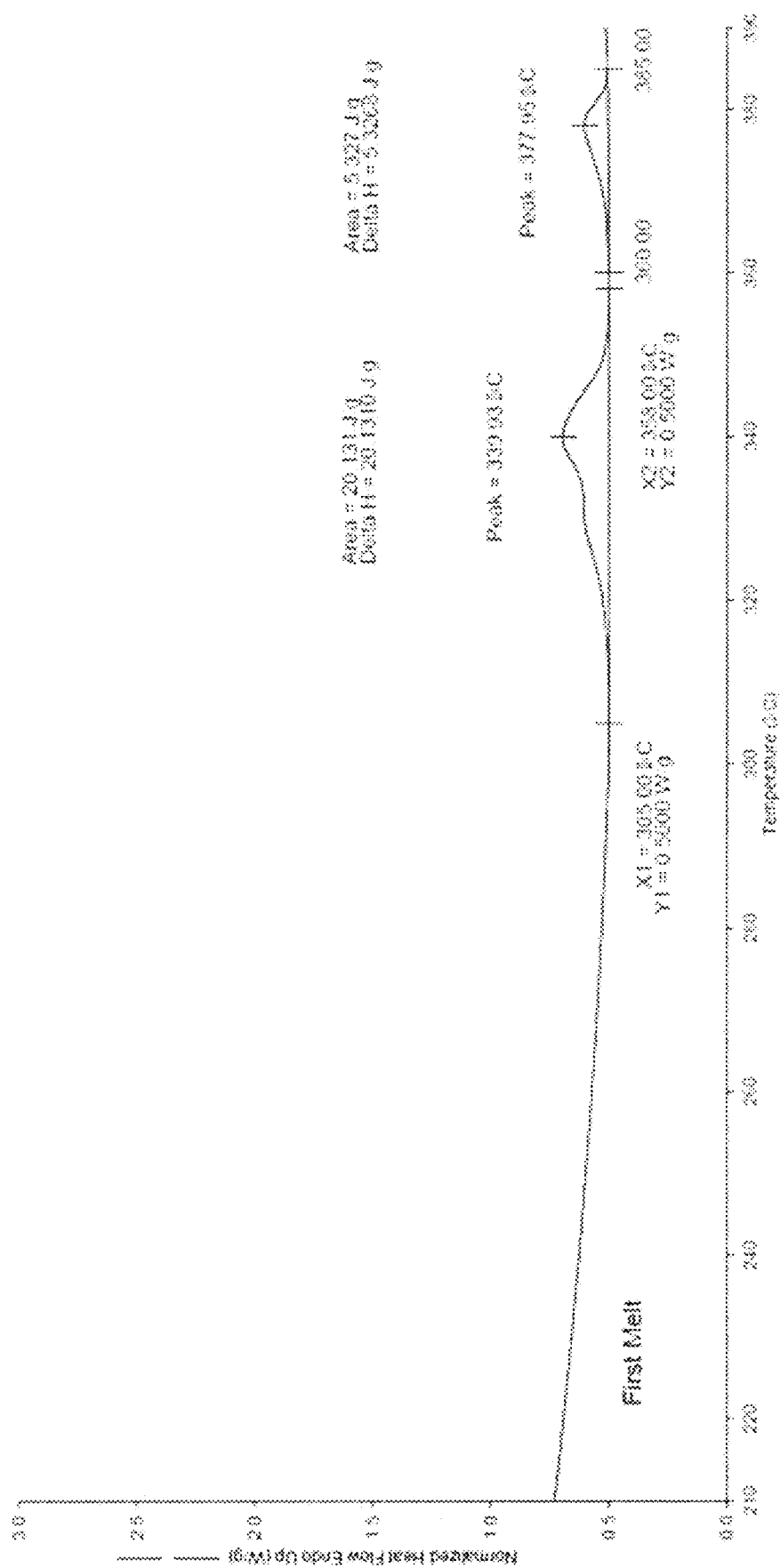
FIG. 3 is a DSC curve of the PTFE porous film of Example 1 determined with a differential scanning calorimeter.
Figure 4:
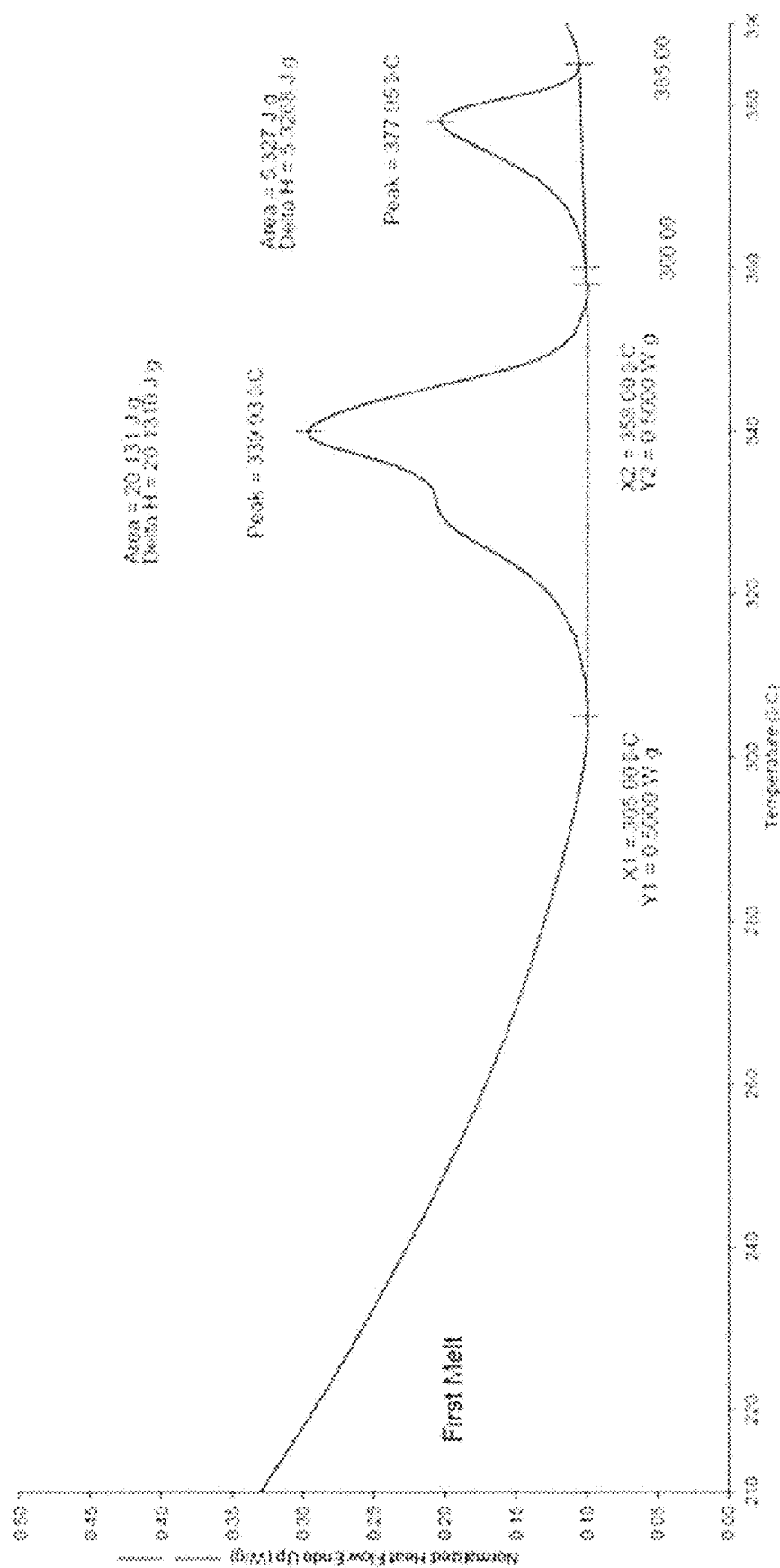
FIG. 4 is a DSC curve obtained by magnifying FIG. 3.
Figure 5:
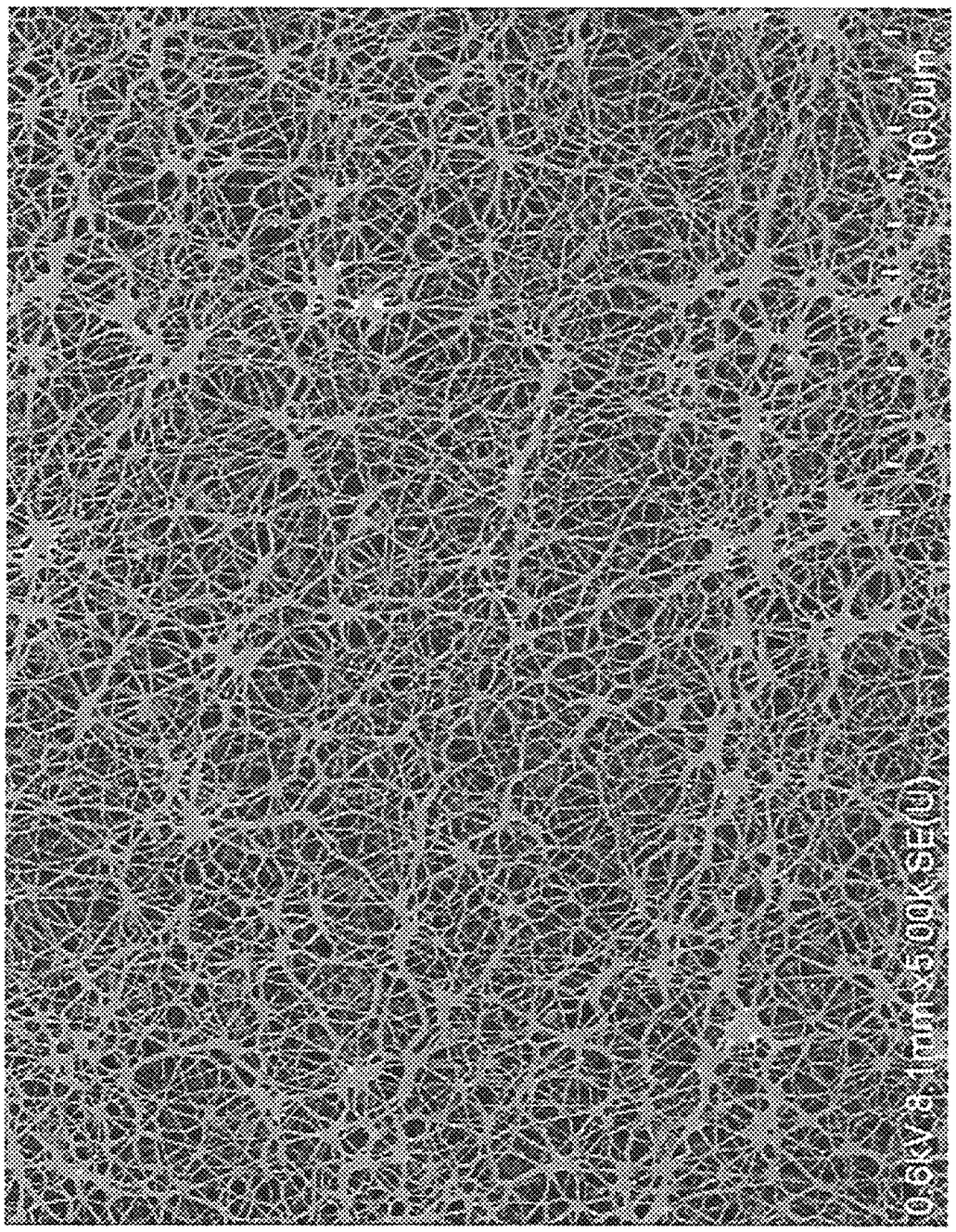
FIG. 5 is an electron microscope photograph of the surface of the PTFE porous film of Example 1 (magnification: 5000 times)

The bubble point, tensile strength, porosity, film thickness, and air permeability of the obtained PTFE porous film and the crystal fusion heat (H3 and H4) and the degree of calcination of the PTFE porous film are shown in Table 1. In addition, a DSC curve of the PTFE porous film obtained in Example 1 is illustrated in FIG. 3, and an electron microscope photograph is illustrated in FIG. 5.

Comparative Example 1

Teflon™ PTFE 650J available from Chemours-Mitsui Fluoroproducts Co., Ltd. was used as PTFE. The standard specific gravity (SSG) of Teflon™ PTFE 650J and the crystal fusion heat (H1, H2, and H1–H2) of the PTFE are shown in Table 1. In addition, a PTFE porous film was obtained in the same manner as in Example 1 with the exception that Teflon™ PTFE 650J was used. The bubble point, tensile strength, porosity, film thickness, and air permeability of the obtained PTFE porous film and the crystal fusion heat (H3 and H4) and the degree of calcination of the PTFE porous film are shown in Table 1.

Comparative Example 2

A PTFE fine powder was obtained in the same manner as in Example 1 with the exception that 570 ml of an aqueous solution in which potassium permanganate ($KMnO_4$) was dissolved was infused with a pump. The standard specific gravity (SSG) of the obtained PTFE fine powder and the crystal fusion heat (H1, H2, and H1–H2) of the PTFE are shown in Table 1.

In addition, a PTFE porous film was obtained in the same manner as in Example 1 with the exception that the PTFE fine powder was used. The bubble point, tensile strength, porosity, film thickness, and air permeability of the obtained PTFE porous film and the crystal fusion heat (H3 and H4) and the degree of calcination of the PTFE porous film are shown in Table 1.

Comparative Example 3

A PTFE porous film was obtained in the same manner as in Example 1 with the exception that the stretching rate was set to 72 mm/sec and the shear rate was set to 11%/sec. The bubble point, tensile strength, porosity, film thickness, and air permeability of the obtained PTFE porous film and the crystal fusion heat (H3 and H4) and the degree of calcination of the PTFE porous film are shown in Table 1.

TABLE 1

| | | | Ex. 1 | Ex. 2 | Ex. 3 | Com. EX. 1 | Com. EX. 2 | Com. EX. 3 |
|---|---|---|---|---|---|---|---|---|
| PTFE porous film production conditions | PTFE Specific Gravity (SSG) | | | 2.14 | | 2.16 | 2.14 | 2.14 |
| | Hydrocarbon solvent (Isopar M) | wt % | 20 | 14 | 16 | | 20 | |
| | Rolling thickness | μm | 200 | 800 | 800 | | 200 | |
| | Stretching Ratio | | | 10 | | | 10 | |
| | Stretching Rate | mm/sec | 720 | 720 | 130 | 720 | 720 | 72 |
| | Stretching distance | mm | | 648 | | | 648 | |
| | Shear rate (stretching rate/stretching distance × 100) | %/sec | 111 | 111 | 20 | 111 | 111 | 11 |
| | Calcination temperature | °C. | | 370 | | | 370 | |
| | Calcination time | sec | 10 | 30 | 30 | | 10 | |
| PTFE porous film characteristics | Bubble point | kPa | 419 | 577 | 405 | 126 | 340 | 310 |
| | Tensile strength | Mpa | 59.6 | 72.5 | 61.2 | 41.3 | 50.1 | 51.2 |
| | Porosity | % | 78 | 81 | 85 | 82 | 76 | 86 |
| | Film thickness | μm | 6.8 | 30.0 | 25.0 | 6.0 | 8.1 | 10.5 |
| | Air permeability | cm³/s/cm² | 0.24 | 0.06 | 0.11 | 1.56 | 0.06 | 0.21 |
| (Crystal fusion heat) | PTFE 1st. RUN 300-360° C. (H1) | J/g | | 68.1 | | 70.1 | 68.1 | 68.1 |
| | 1st. RUN 300-360° C. (H2) | J/g | | 55.2 | | 53.9 | 58.0 | 55.2 |
| | H1-H2 | J/g | | 12.9 | | 16.2 | 10.1 | 12.9 |
| | PTFE porous film 1st. RUN 300-360° C. (H3) | J/g | 19.8 | 22.1 | 20.8 | 25.4 | 22.1 | 20.8 |
| | 1st. RUN 360-385° C. | J/g | 5.4 | 5.8 | 5.6 | 4.8 | 3.8 | 3.8 |
| | 2nd. RUN 300-360° C. (H4) | J/g | 17.6 | 17.6 | 17.6 | 22.24 | 17.6 | 17.6 |
| (Degree of calcination) | H1-H3/H1-H4 | | 0.96 | 0.91 | 0.94 | 0.93 | 0.91 | 0.94 |

INDUSTRIAL FIELD OF APPLICATION

The present invention provides a polytetrafluoroethylene porous film having a small pore diameter, small film thickness, high porosity, and high strength, and a production method thereof.

The present invention can be suitably used in applications such as waterproof and sound-transmitting applications for communication equipment, vent filters for automobiles requiring high water resistance, dust-proofing applications such as bag filters or air filters for dust collection, filter applications such as corrosive liquids, organic solvents, or etching solutions for circuit boards in semiconductor production applications, and applications such as the recovery of valuables in etching solutions.

EXPLANATION OF SYMBOLS 1 and 2: One set of rolls on the inlet side of the biaxial stretching device
3 and 4: One set of rolls on the outlet side of the biaxial stretching device
5: Heating furnace
6: Sheet-like rolled product
7: Vertically stretched film
8: Fixing chuck of biaxial stretching device
9: Sheet-like rolled product
10: Biaxially stretched film (PTFE porous film)

The invention claimed is:
1. A polytetrafluoroethylene porous film, wherein the polytetrafluoroethylene porous film is a single polytetrafluoroethylene porous film having a bubble point in isopropyl alcohol (IPA) according to JIS K3832 not less than 400 kPa and a tensile strength based on JIS K6251 not less than 59.6 MPa.
2. The polytetrafluoroethylene porous film according to claim 1, wherein a first crystal fusion heat of the polytetrafluoroethylene porous film at 360 to 385° C. when heated to 400° C. at a rate of 10° C./min using a differential scanning calorimeter is not less than 5.0 J/g.

3. The polytetrafluoroethylene porous film according to claim 1, wherein a second crystal fusion heat of the polytetrafluoroethylene porous film at 300 to 360° C. in a second heating run determined using a differential scanning calorimeter curve is not greater than 20 J/g, wherein the second crystal fusion heat is determined using a differential scanning calorimeter by a method comprising:

performing a first heating run up to 400° C. at a rate of 10° C./min;

cooling the film to 200° C. at a rate of 10° C./min; and performing the second heating run up to 400° C. at a rate of 10° C. to obtain the differential scanning calorimeter curve.

4. The polytetrafluoroethylene porous film according to claim 3, wherein a degree of calcination(S) of the porous film expressed by the following formula is not less than 0.9:

degree of calcination $(S)=(H1-H3)/(H1-H4)$; wherein

H1 is a third crystal fusion heat in J/g of polytetrafluoroethylene, with no history of heating to 300° C. or higher, at 300 to 360° C. when heated to 400° C. at a rate of 10° C./min using the differential scanning calorimeter, H3 is a fourth fusion heat in J/g of the polytetrafluoroethylene porous film at 300 to 360° C. in the first heating run, and H4 is the second crystal fusion heat in J/g.

5. The polytetrafluoroethylene porous film according to claim 1, wherein a porosity is not less than 70%.

6. The polytetrafluoroethylene porous film according to claim 1, wherein a film thickness of the porous film is not greater than 30 µm.

7. The polytetrafluoroethylene porous film according to claim 4, wherein the polytetrafluoroethylene used in the production of the polytetrafluoroethylene porous film is a polytetrafluoroethylene having a standard specific gravity of not greater than 2.15 and satisfying the following formula:

$H1-H2 \geq 12$ J/g, wherein

H2 is a fifth crystal fusion heat in J/g of a molded product at 300 to 360° C. when heated to 400° C. at a rate of 10° C./min using a differential scanning calorimeter, the molded product being obtained by a process comprising:

adding 28.7 ml of naphtha having a boiling point of from 150 to 180° C. to 100 g of polytetrafluoroethylene having no history of heating to 300° C. or higher and mixing for 3 minutes;

leaving the mixture to stand for 2 hours at 25° C., and then extrusion-molding the mixture at a cylinder cross-sectional area/outlet cross-sectional area ratio of 100, a molding temperature of 25±1° C., and a ram extrusion rate of 0.5 m/min using an extruder to obtain a bead-like extruded product;

drying the bead-like extruded product for 1.5 hours at 25±1° C. and drying for 2 more hours at 150° C. to form a dried product; and stretching the dried product 24 times in the extrusion direction at a molding temperature of 300° C. and a rate of 100%/sec to obtain the molded product.

* * * * *